(12) United States Patent
Lu

(10) Patent No.: US 12,397,668 B2
(45) Date of Patent: Aug. 26, 2025

(54) EXECUTING AN ENERGY TRANSFER DIRECTIVE FOR AN IDLE TRANSPORT

(71) Applicant: TOYOTA MOTOR NORTH AMERICA, INC., Plano, TX (US)

(72) Inventor: Norman Lu, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 18/188,415

(22) Filed: Mar. 22, 2023

(65) Prior Publication Data

US 2023/0219439 A1 Jul. 13, 2023

Related U.S. Application Data

(63) Continuation of application No. 16/821,961, filed on Mar. 17, 2020, now Pat. No. 11,618,329.

(51) Int. Cl.
| | |
|---|---|
| *B60L 53/36* | (2019.01) |
| *B60L 53/53* | (2019.01) |
| *G05B 19/042* | (2006.01) |
| *G05D 1/00* | (2024.01) |

(52) U.S. Cl.
CPC ............... *B60L 53/36* (2019.02); *B60L 53/53* (2019.02); *G05B 19/042* (2013.01); *G05D 1/0212* (2013.01); *G05B 2219/2639* (2013.01); *G05D 1/0287* (2013.01)

(58) Field of Classification Search
CPC .......... B60L 53/36; B60L 53/53; B60L 50/60; B60L 2240/72; G05B 19/042; G05B 2219/2639; G05D 1/0212; G05D 1/0287; H02J 13/00016; H02J 2310/48; H02J 3/322; Y04S 10/126; Y04S 40/124; G06Q 30/0609; G06Q 10/06312; G06Q 50/06; Y02E 60/00; Y02T 10/70; Y02T 10/7072; Y02T 10/72; Y02T 90/12; Y02T 90/16
See application file for complete search history.

(56) References Cited

U.S. PATENT DOCUMENTS

| | | | |
|---|---|---|---|
| 7,956,570 B2 | 6/2011 | Lowenthal et al. | |
| 8,154,246 B1 | 4/2012 | Heitmann | |
| 8,676,636 B2 | 3/2014 | Genschel et al. | |
| 8,698,642 B2 | 4/2014 | Taguchi | |
| 8,796,881 B2 | 8/2014 | Davis | |

(Continued)

FOREIGN PATENT DOCUMENTS

| | | |
|---|---|---|
| AU | 2012100463 A4 | 5/2012 |
| CN | 101678774 A | 3/2010 |

(Continued)

OTHER PUBLICATIONS

English Translation of CN-103855767-A (Year: 2023).*

(Continued)

*Primary Examiner* — Scott A Browne
*Assistant Examiner* — Shahira Baajour

(57) ABSTRACT

An example operation includes one or more of determining, by a transport at a first location, that the transport is not in use, determining, by the transport, a second location to transfer energy stored in the transport, maneuvering, by the (Continued)

transport, to the second location, discharging, by the transport, the stored energy to the second location, and maneuvering, by the transport, to the first location.

20 Claims, 14 Drawing Sheets

(56) References Cited

U.S. PATENT DOCUMENTS

| | | |
|---|---|---|
| 8,860,362 B2 | 10/2014 | Kamen et al. |
| 9,024,571 B2 | 5/2015 | Uyeki |
| 9,026,347 B2 | 5/2015 | Gadh et al. |
| 9,302,594 B2 | 4/2016 | Tripathi et al. |
| 9,371,007 B1 | 6/2016 | Penilla et al. |
| 9,381,821 B2 | 7/2016 | Keeling et al. |
| 9,429,974 B2 | 8/2016 | Forbes, Jr. |
| 9,493,087 B2 | 11/2016 | Leary |
| 9,739,844 B2 | 8/2017 | Widmer et al. |
| 9,744,858 B2 | 8/2017 | Hall et al. |
| 9,754,300 B2 | 9/2017 | Kempton et al. |
| 9,778,653 B1 | 10/2017 | McClintock et al. |
| 9,873,408 B2 | 1/2018 | Capizzo |
| 9,881,259 B2 | 1/2018 | Forbes, Jr. |
| 9,931,952 B2 | 4/2018 | Tripathi et al. |
| 9,969,288 B2 | 5/2018 | Ikeda et al. |
| 9,994,118 B2 | 6/2018 | Williams et al. |
| 10,029,577 B2 | 7/2018 | Widmer et al. |
| 10,252,631 B2 | 4/2019 | Ricci |
| 10,343,537 B2 | 7/2019 | Widmer et al. |
| 10,384,775 B2 | 8/2019 | Krishnamoorthy et al. |
| 10,414,283 B2 | 9/2019 | Kudo et al. |
| 10,981,464 B1 | 4/2021 | Sun |
| 11,108,090 B2 | 8/2021 | Yokoyama et al. |
| 11,571,983 B2 | 2/2023 | Lu |
| 11,993,170 B2 | 5/2024 | Lu |
| 2007/0282495 A1 | 12/2007 | Kempton et al. |
| 2008/0040223 A1 | 2/2008 | Bridges et al. |
| 2008/0040295 A1 | 2/2008 | Kaplan et al. |
| 2008/0281663 A1 | 11/2008 | Hakim et al. |
| 2009/0085522 A1 | 4/2009 | Matsumoto |
| 2009/0222143 A1* | 9/2009 | Kempton ............... H02J 3/322 700/291 |
| 2009/0224939 A1 | 9/2009 | Stocker et al. |
| 2010/0242906 A1* | 9/2010 | Konezny ............... G07C 5/008 123/339.14 |
| 2011/0221393 A1* | 9/2011 | Billmaier ............... H02J 3/02 320/109 |
| 2011/0276448 A1 | 11/2011 | Perper et al. |
| 2012/0025764 A1 | 2/2012 | Lee |
| 2012/0035778 A1 | 2/2012 | Kong |
| 2012/0109798 A1 | 5/2012 | Shelton et al. |
| 2012/0169282 A1 | 7/2012 | Helnerus et al. |
| 2012/0245750 A1 | 9/2012 | Paul et al. |
| 2012/0299373 A1 | 11/2012 | Yoshida |
| 2012/0303259 A1* | 11/2012 | Prosser ............... B60L 53/57 701/400 |
| 2013/0119920 A1 | 5/2013 | Hsu et al. |
| 2013/0166096 A1 | 6/2013 | Jotanovic |
| 2013/0218458 A1 | 8/2013 | Scholl |
| 2013/0342310 A1 | 12/2013 | Park et al. |
| 2014/0167678 A1 | 6/2014 | Guillou et al. |
| 2015/0069970 A1 | 3/2015 | Sarkar et al. |
| 2015/0286365 A1* | 10/2015 | Mizukami ............ G06F 3/04815 715/757 |
| 2015/0298565 A1 | 10/2015 | Iwamura et al. |
| 2015/0306967 A1 | 10/2015 | Cohen |
| 2015/0354974 A1 | 12/2015 | Takehara et al. |
| 2015/0360578 A1* | 12/2015 | Duan ............... B60W 50/14 340/455 |
| 2016/0075247 A1 | 3/2016 | Uyeki |
| 2016/0288653 A1 | 10/2016 | Tsukamoto |
| 2017/0259674 A1 | 9/2017 | Yonehana |
| 2017/0282736 A1 | 10/2017 | Goei |
| 2017/0282744 A1* | 10/2017 | Koo ............... B60L 53/305 |
| 2017/0355354 A1 | 12/2017 | Hassounah |
| 2017/0358041 A1 | 12/2017 | Forbes, Jr. et al. |
| 2018/0111494 A1 | 4/2018 | Penilla et al. |
| 2018/0118045 A1 | 5/2018 | Gruzen et al. |
| 2018/0143035 A1 | 5/2018 | Ricci |
| 2018/0238698 A1 | 8/2018 | Pedersen |
| 2018/0345807 A1 | 12/2018 | Cun |
| 2018/0345808 A1 | 12/2018 | Cun |
| 2019/0009756 A1 | 1/2019 | Jacobs |
| 2019/0061546 A1 | 2/2019 | Miftakhov |
| 2019/0107406 A1 | 4/2019 | Cox et al. |
| 2019/0122561 A1 | 4/2019 | shimizu et al. |
| 2019/0202315 A1 | 7/2019 | Wilding et al. |
| 2019/0217735 A1 | 7/2019 | Donnelly et al. |
| 2019/0275892 A1 | 9/2019 | Williams et al. |
| 2019/0280509 A1 | 9/2019 | Yokoyama et al. |
| 2019/0285892 A1 | 9/2019 | Yang |
| 2019/0308513 A1 | 10/2019 | Akhavan-Tafti |
| 2019/0315236 A1 | 10/2019 | Mere |
| 2019/0337392 A1 | 11/2019 | Joshi et al. |
| 2020/0101850 A1 | 4/2020 | Harty et al. |
| 2020/0144838 A1 | 5/2020 | Penilla et al. |
| 2020/0175614 A1 | 6/2020 | Fox et al. |
| 2020/0218270 A1 | 7/2020 | Gu et al. |
| 2020/0226305 A1 | 7/2020 | Trivelpiece et al. |
| 2020/0262305 A1* | 8/2020 | Chakraborty ............ B60L 53/57 |
| 2020/0276910 A1 | 9/2020 | Harty et al. |
| 2020/0282859 A1 | 9/2020 | Shin |
| 2020/0353839 A1 | 11/2020 | Tarchinski et al. |
| 2021/0074094 A1 | 3/2021 | Schumacher |
| 2021/0199467 A1 | 7/2021 | Bellifemine et al. |
| 2021/0213846 A1 | 7/2021 | Sun et al. |
| 2021/0213848 A1 | 7/2021 | Sun |
| 2021/0256472 A1 | 8/2021 | Javidan et al. |
| 2021/0291671 A1 | 9/2021 | Lu |
| 2021/0291691 A1 | 9/2021 | Lu |
| 2021/0331603 A1 | 10/2021 | Brombach et al. |

FOREIGN PATENT DOCUMENTS

| | | | |
|---|---|---|---|
| CN | 102891505 A | | 1/2013 |
| CN | 103855767 A | * | 6/2014 |
| CN | 101938146 B | | 12/2014 |
| CN | 104520133 A | | 4/2015 |
| CN | 103010040 B | | 6/2015 |
| CN | 104701931 A | | 6/2015 |
| CN | 104753164 A | | 7/2015 |
| CN | 105356459 A | | 2/2016 |
| CN | 103915869 B | | 4/2016 |
| CN | 103562001 B | | 5/2016 |
| CN | 102947124 B | | 2/2017 |
| CN | 108054773 A | | 5/2018 |
| CN | 109177765 A | | 1/2019 |
| CN | 109334482 A | | 2/2019 |
| CN | 109398149 A | | 3/2019 |
| CN | 107176041 B | | 11/2019 |
| DE | 202012105091 U1 | | 6/2013 |
| DE | 202010018487 U1 | | 1/2017 |
| JP | 2007020397 A | | 1/2007 |
| JP | 2009118652 A | | 5/2009 |
| JP | 2011197932 A | | 10/2011 |
| JP | 4893653 B2 | | 3/2012 |
| JP | 2012120295 A | | 6/2012 |
| JP | 2013104473 A | | 5/2013 |
| JP | 2014056589 A | | 3/2014 |
| JP | 6117868 B2 | | 4/2017 |
| JP | 2017096497 A | | 6/2017 |
| JP | 6190948 B2 | | 8/2017 |
| JP | 2018117517 A | | 7/2018 |
| JP | 6399928 B2 | | 10/2018 |
| JP | 2019075134 A | | 5/2019 |
| JP | 2019083528 A | | 5/2019 |
| KR | 101033880 B1 | | 5/2011 |
| KR | 20120062089 A | | 6/2012 |
| KR | 20140078623 A | | 6/2014 |
| KR | 20140109568 A | | 9/2014 |
| KR | 20150079613 A | | 7/2015 |
| KR | 20180091976 A | | 8/2018 |
| NO | 2013061410 A1 | | 5/2013 |

(56) References Cited

FOREIGN PATENT DOCUMENTS

| TW | 201722025 A | 6/2017 |
|---|---|---|
| WO | 2010060720 A2 | 6/2010 |
| WO | 2011039284 A2 | 4/2011 |
| WO | 2011102857 A1 | 8/2011 |
| WO | 2012098660 A1 | 7/2012 |
| WO | 2013108246 A2 | 7/2013 |
| WO | 2017094431 A1 | 6/2017 |
| WO | 2018196803 A1 | 11/2018 |

OTHER PUBLICATIONS

EP Office Action dated Apr. 5, 2022, issued in EP Application No. 2163080.1.
EP Search Report issued in the related EP International Application No. EP21163080, mailed on Jul. 30, 2021.
Notice of Reasons for Rejection issued in the JP Patent Application No. 2021-042261, mailed on Aug. 23, 2022.
Notification of the First Office Action issued in the CN Application No. 202110279683.9, mailed on Apr. 15, 2023.
Non Final Office Action issued in the Parent U.S. Appl. No. 16/821,961, mailed on Jul. 8, 2022.
Final Office Action issued in the Parent U.S. Appl. No. 16/821,961, mailed on Sep. 28, 2022.
Notice of Allowance issued in the Parent U.S. Appl. No. 16/821,961, mailed on Nov. 23, 2022.
Final Office Action issued in CN Application No. 202110279683.9, mailed on Feb. 20, 2024.

\* cited by examiner

EXECUTING AN ENERGY TRANSFER DIRECTIVE FOR AN IDLE TRANSPORT

CROSS-REFERENCE TO RELATED APPLICATIONS

This application is a continuation of U.S. patent application Ser. No. 16/821,961, filed on Mar. 17, 2020, the entire disclosure of which is incorporated by reference herein.

Cross-reference is made to the following commonly assigned U.S. patent applications being filed on the same date herewith: Ser. No. 16/821,905, entitled, "WIRELESSLY NOTIFYING A TRANSPORT TO PROVIDE A PORTION OF ENERGY"; Ser. No. 16/821,923, entitled, "DISTANCE-BASED ENERGY TRANSFER FROM A TRANSPORT"; Ser. No. 16/821,951, entitled, "MOBILE TRANSPORT FOR EXTRACTING AND DEPOSITING ENERGY"; and Ser. No. 16/821,974, entitled, "TRANSPORT-BASED ENERGY ALLOCATION," each of which is incorporated by reference herein for all purposes.

TECHNICAL FIELD

This application generally relates to providing energy to an electric grid, and more particularly, to executing an energy transfer directive for an idle transport.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer located on and or off of the transport.

There may be occurrences where an electric grid or system is in need of excess energy. The reason many blackouts occur is an increased use of energy. The extra power used to keep dwellings and buildings cool may overwhelm the grid in a given area and cause power failures. This situation may occur during times of high temperature, or any other condition when a needed flow of electricity needs to be managed. The terms charging station, electric grid, grid and system may refer to independent elements or a combination of one or more of these elements herein.

With the advent of autonomous vehicles on the horizon, many of the electric vehicles are able to provide energy to the electric grid as needed, yet communication is not possible with the electric vehicles and the charging stations coupled with the electric grid. What is needed is a solution to overcome the above limitations.

SUMMARY

One example embodiment provides a method that includes one or more of determining, by a transport at a first location, that the transport is not in use, determining, by the transport, a second location to transfer energy stored in the transport, maneuvering, by the transport, to the second location, discharging, by the transport, the stored energy to the second location, and maneuvering, by the transport, to the first location.

Another example embodiment provides a transport that includes a processor configured to perform one or more of determine a transport at a first location is not in use, determine a second location to transfer energy stored in the transport, maneuver to the second location, discharge the stored energy to the second location, and maneuver to the first location.

A further example embodiment provides a non-transitory computer readable medium comprising instructions, that when read by a processor, cause the processor to perform one or more of determining, by a transport at a first location, that the transport is not in use, determining, by the transport, a second location to transfer energy stored in the transport, maneuvering, by the transport, to the second location, discharging, by the transport, the stored energy to the second location, and maneuvering, by the transport, to the first location.

DETAILED DESCRIPTION

Figure 1A:
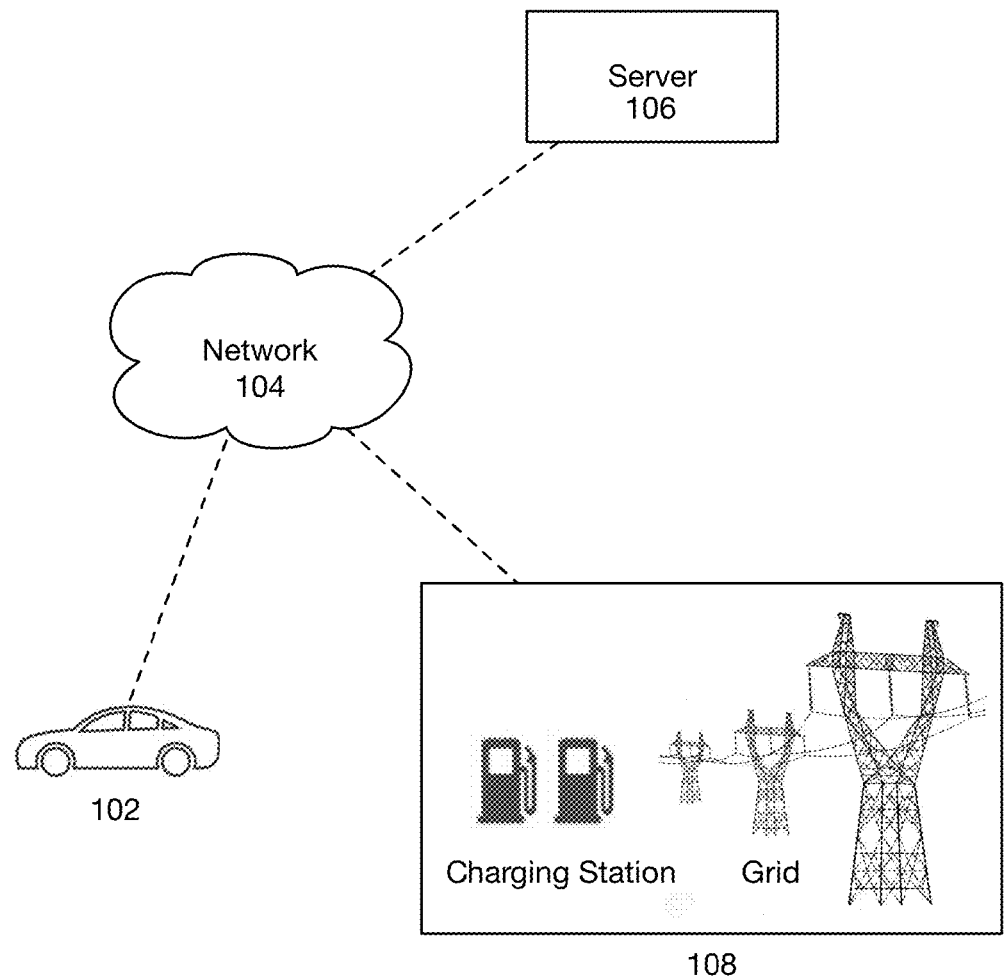
FIG. 1A illustrates an example system diagram, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current solution, a transport may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications, which leverage tamper-proof properties of the shared or distributed ledger (i.e., which may be in the form of a blockchain) database and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action. A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Autonomous driving system utilize software and an array of sensors. Machine learning, sensors including cameras, can be utilized to allow a self-driving car to navigate.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant solution includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

The grid, or other equipment or area associated with the grid that store power, in one embodiment, communicates with a network and may be implemented through a computer (s) associated with the grid, such that the grid computer sends a message to a server, wherein each of the grid computer and the server are communicably coupled to the network. The network may be a data network such as the global internet, a private network, or any other similar network. The message includes a request for surplus energy. The server, in one embodiment, notifies a Mobile Energy Storage Unit (MESU) of the request. The MESU is a transport that can maneuver to other objects (such as transports, charging stations, energy sources, the grid, etc.) and provide and/or retrieve energy from these objects. The MESU may be partially or fully autonomous and have the capability to provide and/or retrieve energy via an inductive transfer or a capacitive transfer.

The instant application determines that a transport (or other object) is idle and, at that time or a future time, determines how much energy to retrieve from the transport, and to location to transfer the energy back to the grid. The transport then maneuvers back to its original location and/or continues to retrieve energy from other transports or objects. In one embodiment, the transport independently determines that energy is to be transferred to the electric grid by assessing one or more of a date, a time, a historical energy use, etc.

As an example, a transport (such as an autonomous transport) is idle for a period of time and will not be utilized for a future determined period of time. The instant solution executing on a process associated with the transport determines that there is amount of time before the transport will be utilized and the instant solution locates an available charging station that allows a transfer of energy that was retrieved from the transport. If a charging station is found, the MESU maneuvers to the charging station and transfers a portion or all of its stored energy therein.

It is assumed that the functionality of the current solution is performed via a transport that has opted into the instant solution. As such, there is an agreement between the transport (and/or the operator of the transport) and the electric grid (and/or the MESU) to provide the instant solution.

In one embodiment, the electric grid communicates with the transport to request surplus energy. This may be established via a connection between the electric grid and the transport through a wired or wireless network.

The current solution allows for a transport to discharge some of the energy stored in its batteries to the grid via the MESU.

In one embodiment, the transport or the MESU locates a nearby location to transfer surplus energy to, as well as determine the availability of charging/discharging ports at the location. A computer associated with the MESU, or the MESU itself, has access to a charging station network, such as the network that navigation systems utilize to inform users of charging opportunities. The computer interacts with data sources, such as via the internet to determine an availability and location of charging stations proximate to the current geographical position of the transport.

In one embodiment, the transport and/or occupant(s) of the transport are compensated when charge is provided to the grid. This may be reflected via a monetary or other value exchange through a computer associated with the electric grid and a computer associated with the transport, or any other manner where one party is compensated for a service or product."

The transferring of power from a transport to the MESU, or to another transport, charging station, grid, etc., is achieved via at least two distinct methods, an inductive transfer or a capacitive transfer. In inductive transfer, magnetic field coupling between multiple conducting elements is utilized to transfer energy. In capacitive transfer, electric field coupling between conducting elements are used to transfer the energy.

In one embodiment, an idle transport will periodically check its current power level and energy management profile to determine if it can drive itself (in the case the transport is autonomous or has such a capability) to a charging station to discharge a portion of its energy. A controller, or other equipment, is configured to control a power conversion unit of the transport to transfer energy between an energy providing source and a transport energy storage unit, such as the MESU, based on a specific amount of energy usage indicated by an energy management profile. In one embodiment, the energy management profile is configured by a user of the transport, an owner of the transport, a user of the MESU, and owner of the MESU, the charging station, the electric grid, etc.

The energy management profile, in one embodiment, includes a default charge level, a default discharge level, a minimum discharge credit rate, a list of acceptable vendors, a list of acceptable charge/discharge stations, a maximum driving distance, and a maximum away time. Further, the profile may include values for the one or more settings based on one or more of time of day, day of the week and geo location. The profile may also include one or more zones based on location, such as, but not limited to a home zone, a work zone, a travel zone, a disturb zone (when the transport is open for coordination with the charging station or MESU at any time and/or any location) and a do-not disturb zone (when the transport is not open for coordination with the charging station or MESU or open for coordination with the charging station or MESU at particular time and/or location).

FIG. 1A illustrates a system diagram 100, in one embodiment. A server 106 is communicably coupled to a network 104. In one embodiment, the instant solution executes in memory on a processor of a computer associated with the transport 102, the server 106, or any other processor located on any element in the system diagram. The grid 108 is the electric grid and includes one or more charging stations where transports may receive or provide energy (also referred to as power or charge herein). In one embodiment, the grid and the charging stations are operated and/or managed by separate entities but work together to ensure energy can be transferred to and from a transport or the MESU. The grid is also communicably connected to the network 104, such as through a computer or server associated with the grid and/or charging station. One or more databases may be connected to the server 106 (not depicted) and is used to store and retrieve data pertaining to the current application.

Figure 1B:
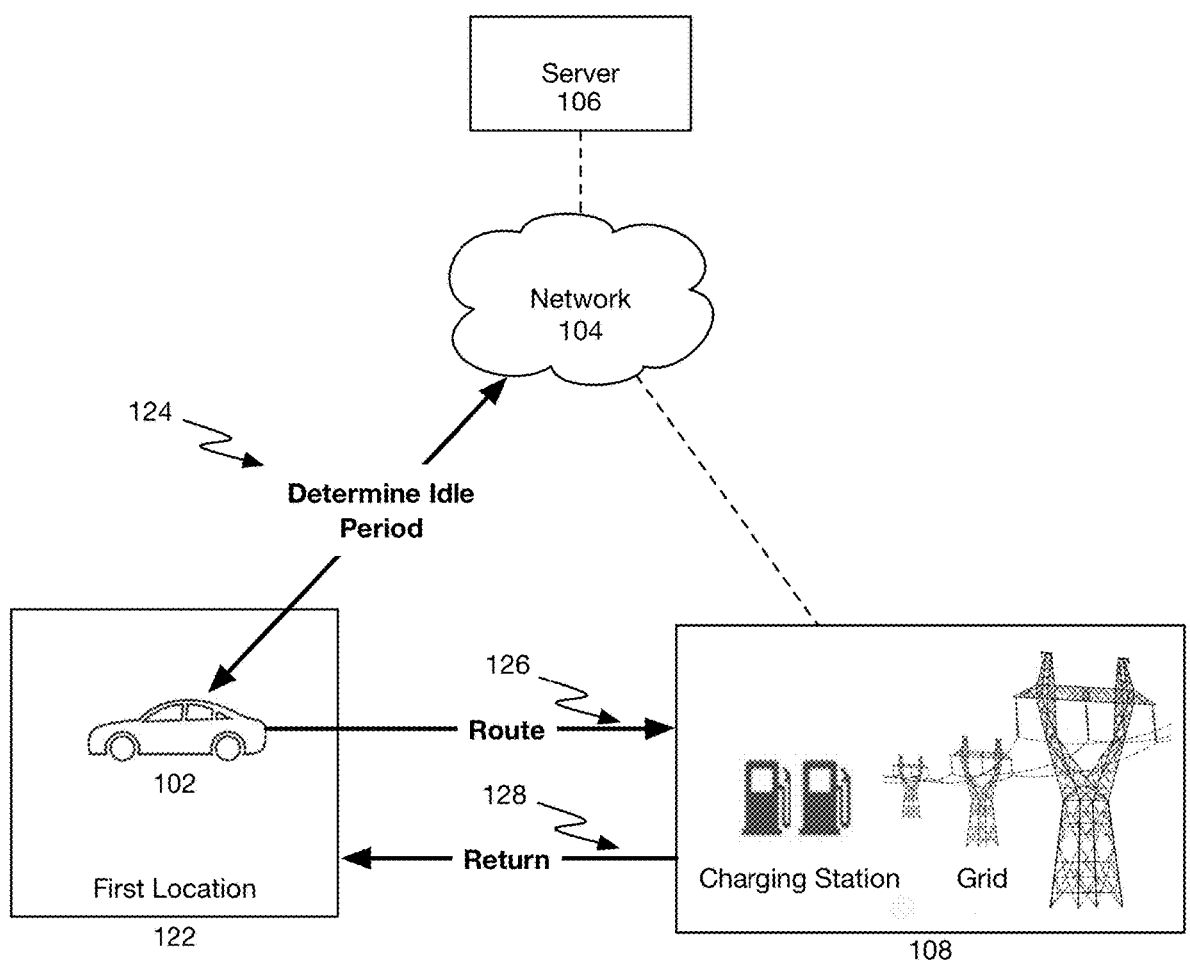
FIG. 1B illustrates an example diagram of a transport provide a stored charge to a grid, according to example embodiments.

FIG. 1B illustrates a system diagram 120 of a transport providing a stored charge to a grid, in one embodiment. In one embodiment, authorization may be necessary to permit the transport 102 to route to the charging station 108 and discharge a portion of stored energy. This may occur via the transport receiving a request for charge from the charging station 108. The request is sent to one or more transports 102 via the network 104. When the request is received at the transport(s) 102, the instant solution, wholly or partially executing in the transport 102, begins the process of determining idle times to route to the charging station 108 to discharge stored energy.

The transport 102, at a first location 122 determines an idle time 124. This idle time may be determined completely or partially by the transport and/or the server 106. The transport 102, such as an autonomous transport, determines a most probable next use and thus determines an amount of idle time. To determine a next use, a processor of a computer associated with the transport 102 contains code that, when executed, allows the transport to gain an understanding of an amount of time the transport will be unused, and/or a next scheduled use of the transport. In one embodiment, the transport analyzes the historical use of routes and times of use. This may help the transport determine if an operator of the transport 102 works at an office building from 9 am to 5 pm every day. If so, the transport 102 will be able to ascertain that it may be idle between those hours, with an additional understanding that the transport may be utilized during a lunch break. In one embodiment, the transport interfaces with Application Programming Interfaces (APIs) of a calendar application associated with occupants of the transport to determine upcoming, scheduled events on the driver's/occupant's calendar. By querying a calendar application via APIs, or by receiving input from the user/owner of the transport, the instant solution can determine if there are any irregular destinations upcoming and delay or stop the scheduling of the activity. In one embodiment, the server 106 is used to determine an idle time of the transport 102 and communicates therein via the network 104. The transport 102 routes 126 to the grid/charging station 108. This may be automatically performed such as in the scenario where the transport 102 is an autonomous transport. The transport 102 connects (preferably wirelessly but in one embedment, via a nozzle) to the charging station 108 and a portion of the stored charge in the transport 102 is extracted to the grid 108. When completed, the transport 102 returns 128 to the first location 122 or to an alternate location (including another charging station/grid).

The instant solution determines when the transport 102 will be idle for a period of time greater than an amount of time for the transport 102 to route to the grid 108, deposit a portion of stored charge to the grid 108, and route back to the original, or different, location. The determination of an amount of idle time of the transport may be through one or more of: analysis of data of the historical use of the transport 102, use of a calendar application of one or more occupants of the transport 102, and the like. The server 106 and/or transport 102 receives data pertaining to the grid 108 such as days when the grid 108 currently or in the future has a need for energy. In another embodiment, the transport 102 and/or server 106 queries the grid 108, by interfacing with APIs or other applications therein for example.

In one embodiment, the availability of the grid 108 is utilized. For example, a charging station 108 will have a limited number of ports. The instant solution analyzes the available ports at the charging station 108 to further determine availability. In one embodiment, the charging station predicts the available ports according to data it analyzes of the transports at the ports, the types of transports, and the types of charging stations (fast-charging or not, etc.).

In one embodiment, the instant solution executing wholly or partially in the transport 102 and the server 106 allows for an occupant of the transport 102, or another device associated with an occupant or a person associated with the transport, to override the request to transfer energy to a grid 108. As such, the person interfaces with a device such as a mobile device and denies the charge request.

In one embodiment, the maneuvering of the transport 102 to the grid 108 is based on one or more of a current level of energy stored in the transport, an indicated charge amount of the transport, an indicated discharge amount of the transport, a default charge amount of the transport, a default discharge amount of the transport, a minimum charge credit rate, a minimum discharge credit rate, a list of acceptable vendors, a list of acceptable energy stations, a maximum distance of the maneuvering, a maximum away time, one or more time of day rules, one or more day of week rules, and one or more location rules.

In an further embodiment, the instant solution includes determining, by a transport at a first location, that the transport is not in use, determining, by the transport, a second location to transfer energy stored in the transport, maneuvering, by the transport, to the second location, discharging, by the transport, the stored energy to the second location, and maneuvering, by the transport, to the first location, wherein the second location is determined by a consensus of a number of other transports estimating an amount of energy each will be discharging to the second location, wherein the second location is determined by an amount of time the transport is not in use for a primary purpose, a distance from the first location to the second location and an amount of the stored energy available to discharge at the second location, wherein the maneuvering occurs when the transport receives an average amount of energy being provided to the second location and can exceed the average amount, wherein a remaining portion of the stored energy allows one or more of: a routing of the transport to at least one other destination prior to arriving at the second location and a routing of the transport to at least one other destination prior to returning to the first location. The instant solution also includes sending, by the second location to the transport, a value to provide to the transport, based on an amount of the stored energy discharged to the second location and sending, by the second location to the transport, a value to provide to the transport, based on an amount of time until the stored energy is discharged to the second location. In other embodiments, the transport determines it is not in use when the transport is not in motion for a period of time, the second location is based on at least one of a weather condition and a natural occurrence and prompting for one of a user confirmation or an override of the maneuvering to the second location.

Figure 2A:
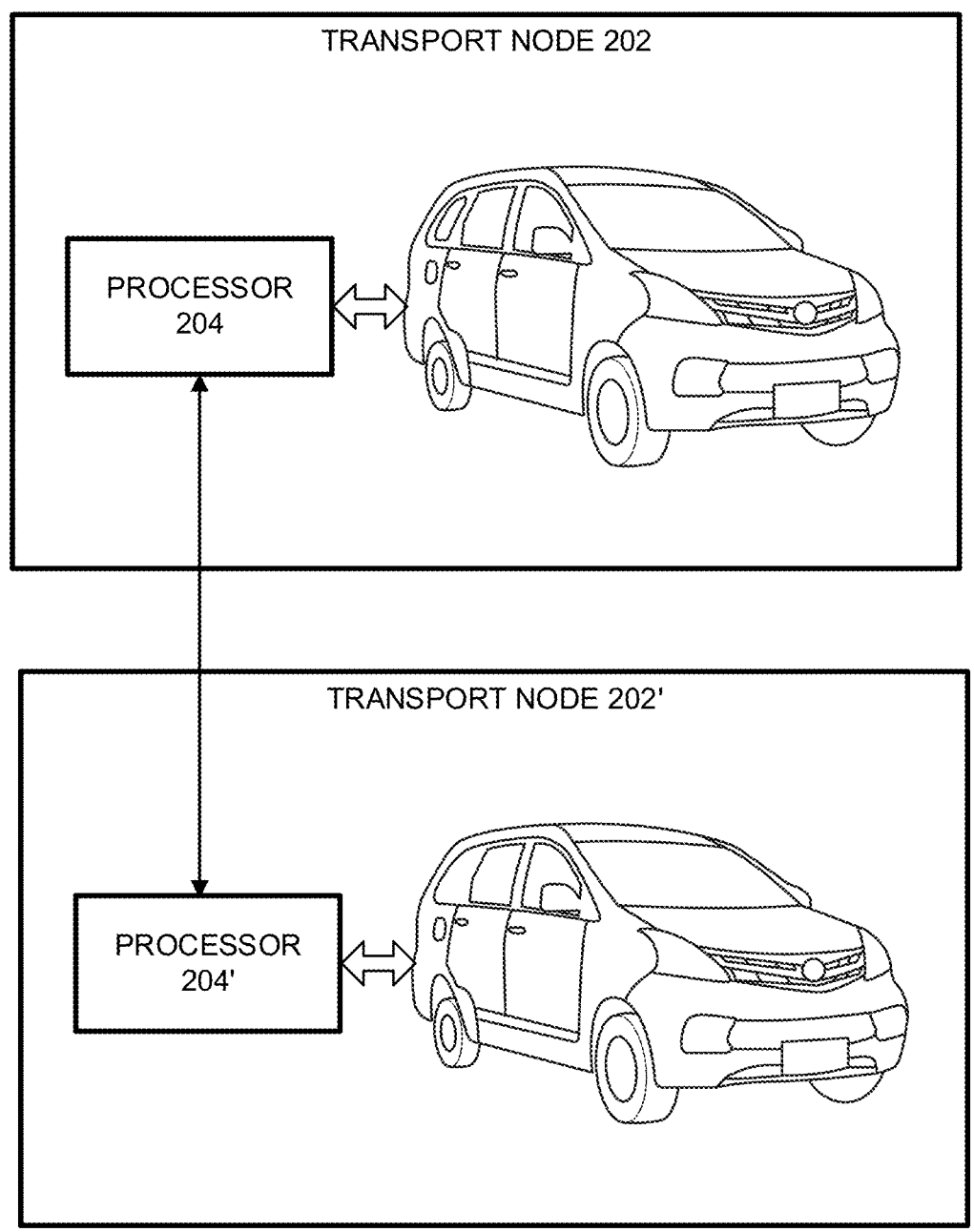
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
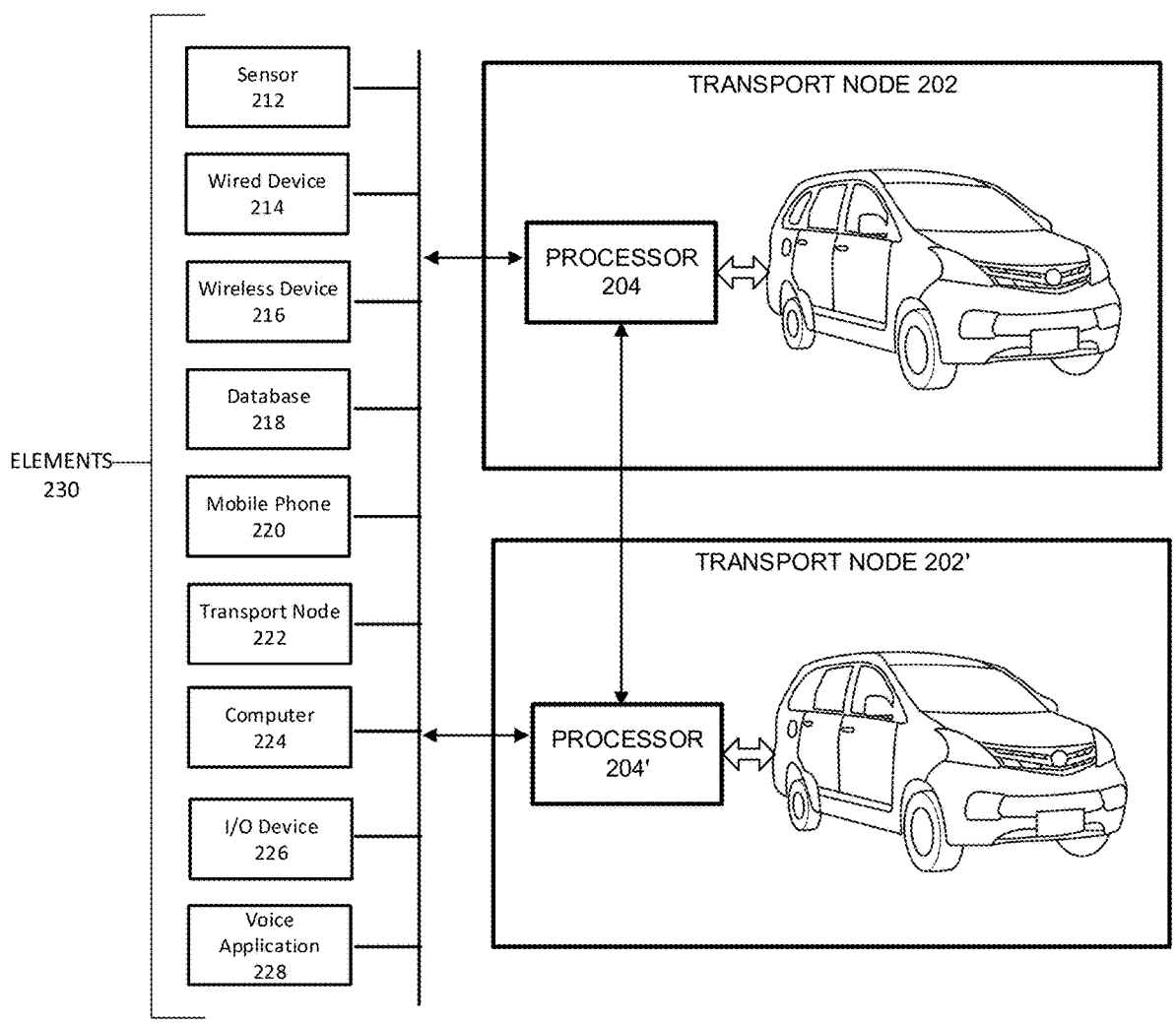
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204, which may initiate the transport node 202 to take an action, may further provide the information or additional information to the processor 204', which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
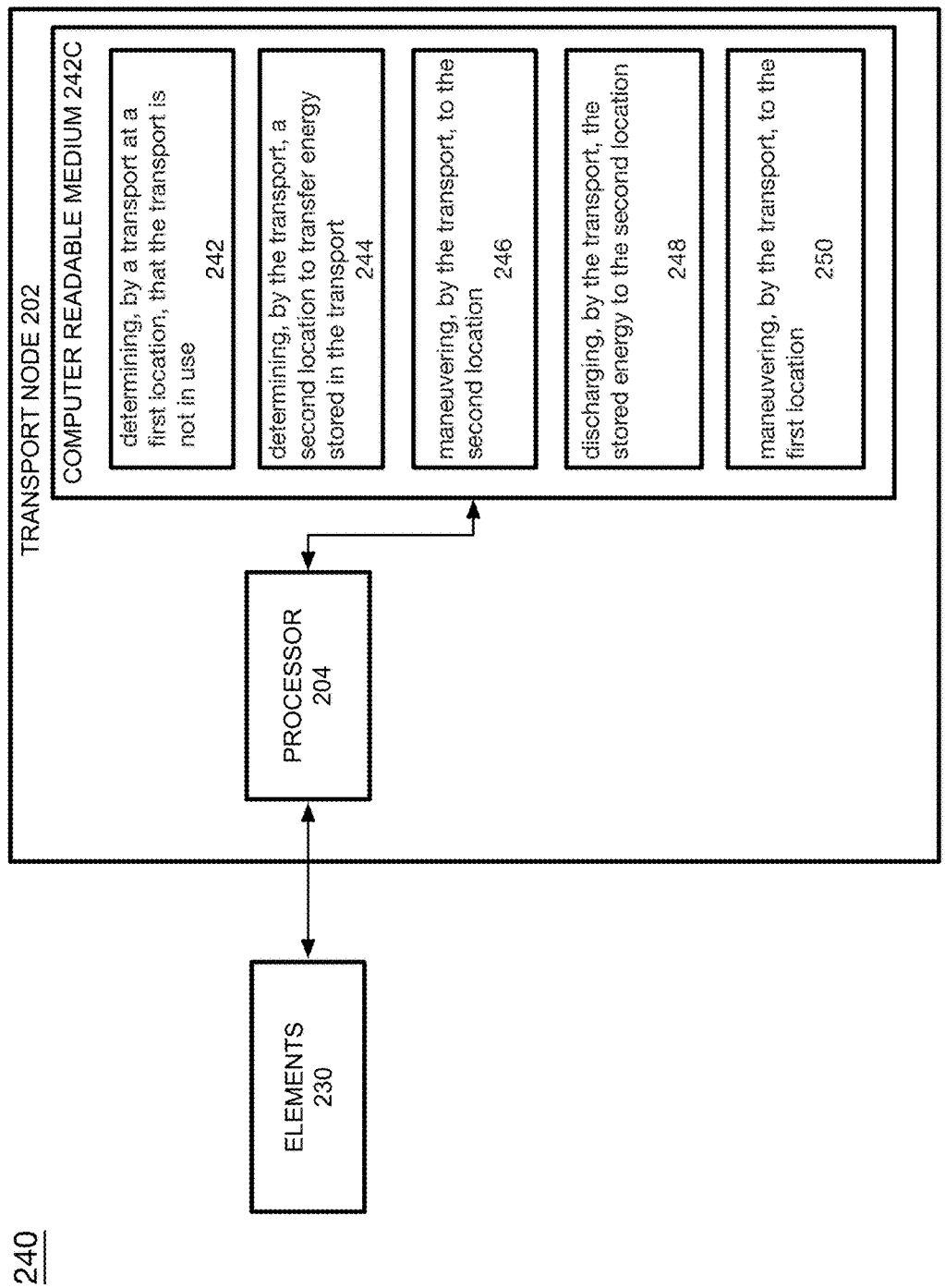
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of determining, by a transport at a first location, that the transport is not in use 242, determining, by the transport, a second location to transfer energy stored in the transport 244, maneuvering, by the transport, to the second location 246, discharging, by the transport, the stored energy to the second location 248, and maneuvering, by the transport, to the first location 250.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3A:
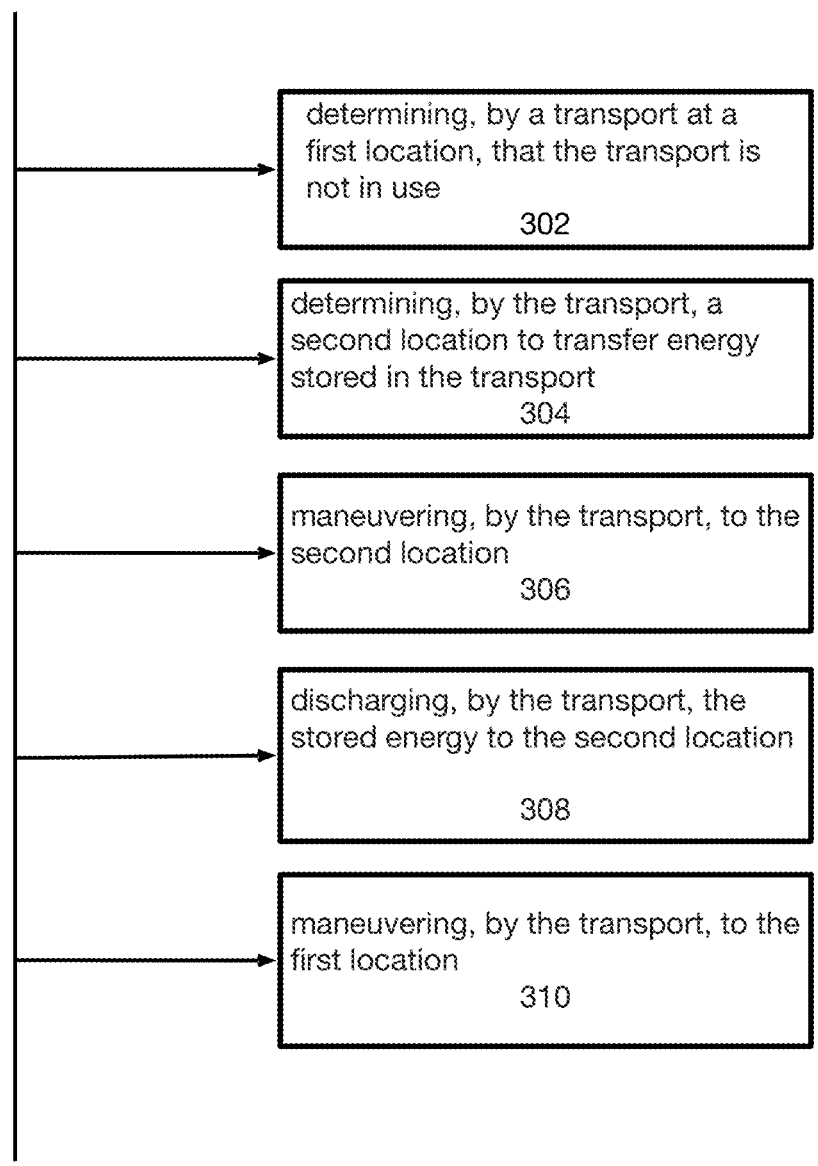
FIG. 3A illustrates a flow diagram, according to example embodiments.

FIG. 3A illustrates a flow diagram 300, according to example embodiments. Referring to FIG. 3A, the flow comprises determining, by a transport at a first location, that the transport is not in use 302, determining, by the transport, a second location to transfer energy stored in the transport 304, maneuvering, by the transport, to the second location 306, discharging, by the transport, the stored energy to the second location 308, and maneuvering, by the transport, to the first location 310.

Figure 4:
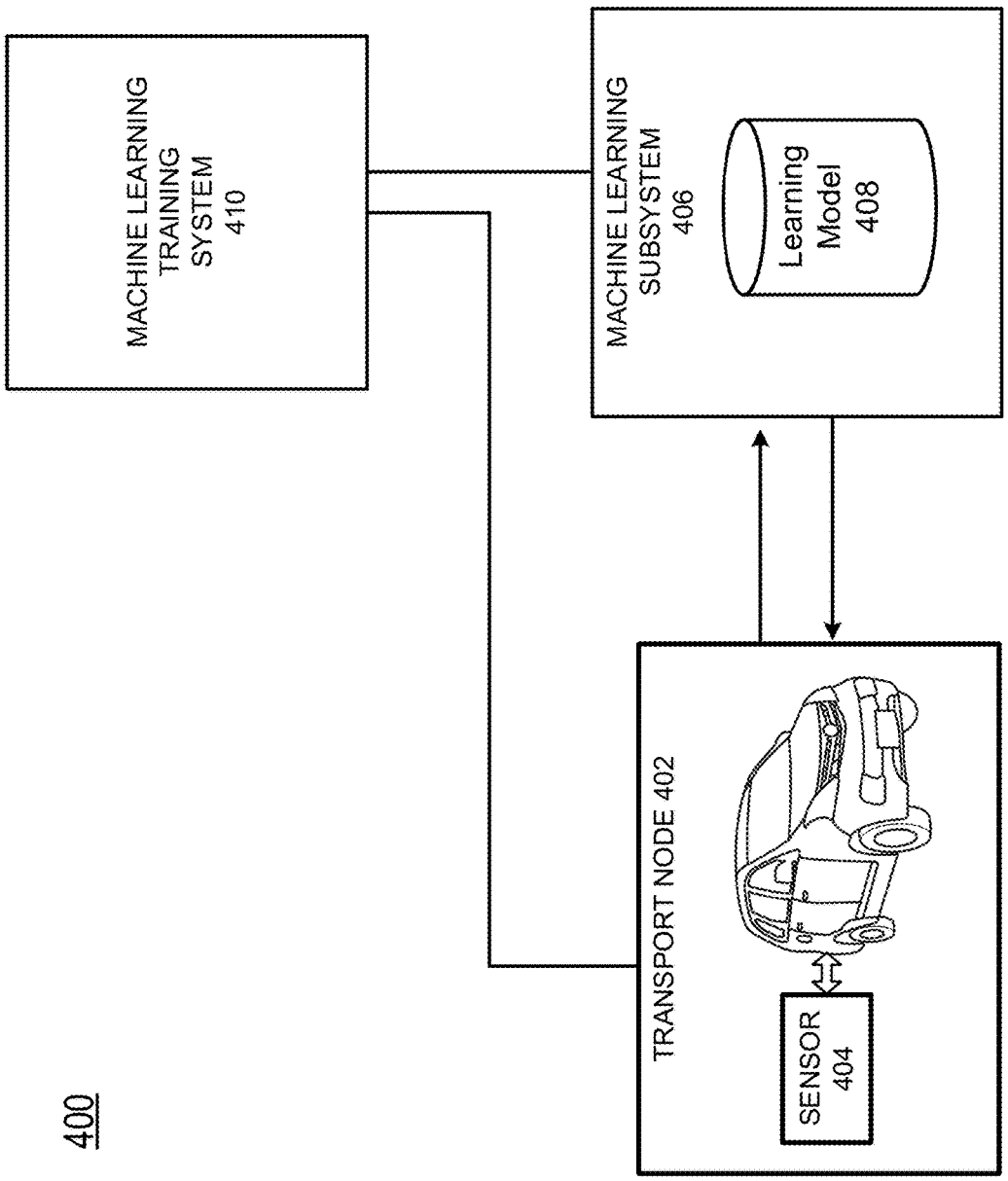
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408, which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport node 402 based on the predictions from the learning model 408.

In a further embodiment, the transport node 402 may send the one or more sensor data 404 to the machine learning training system 410. In yet another embodiment, the machine learning subsystem 406 may send the sensor 404 data to the machine learning training subsystem 410. In one embodiment, the machine learning subsystem 406 and the machine learning training subsystem 410 may be one system. One or more of the applications, features, steps, solutions, etc., described and/or depicted herein may utilize the machine learning network 400 as described herein.

Figure 5A:
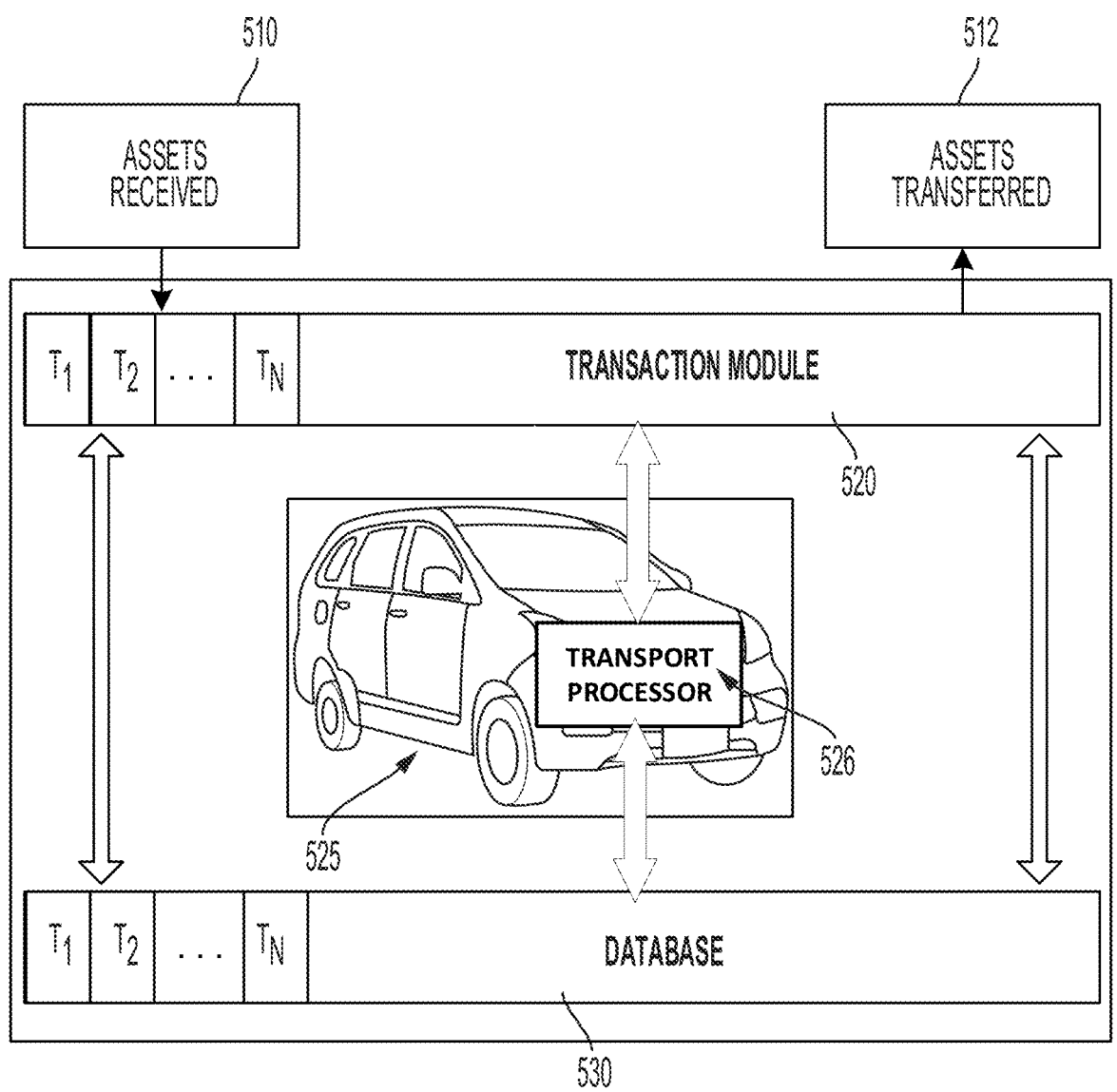
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
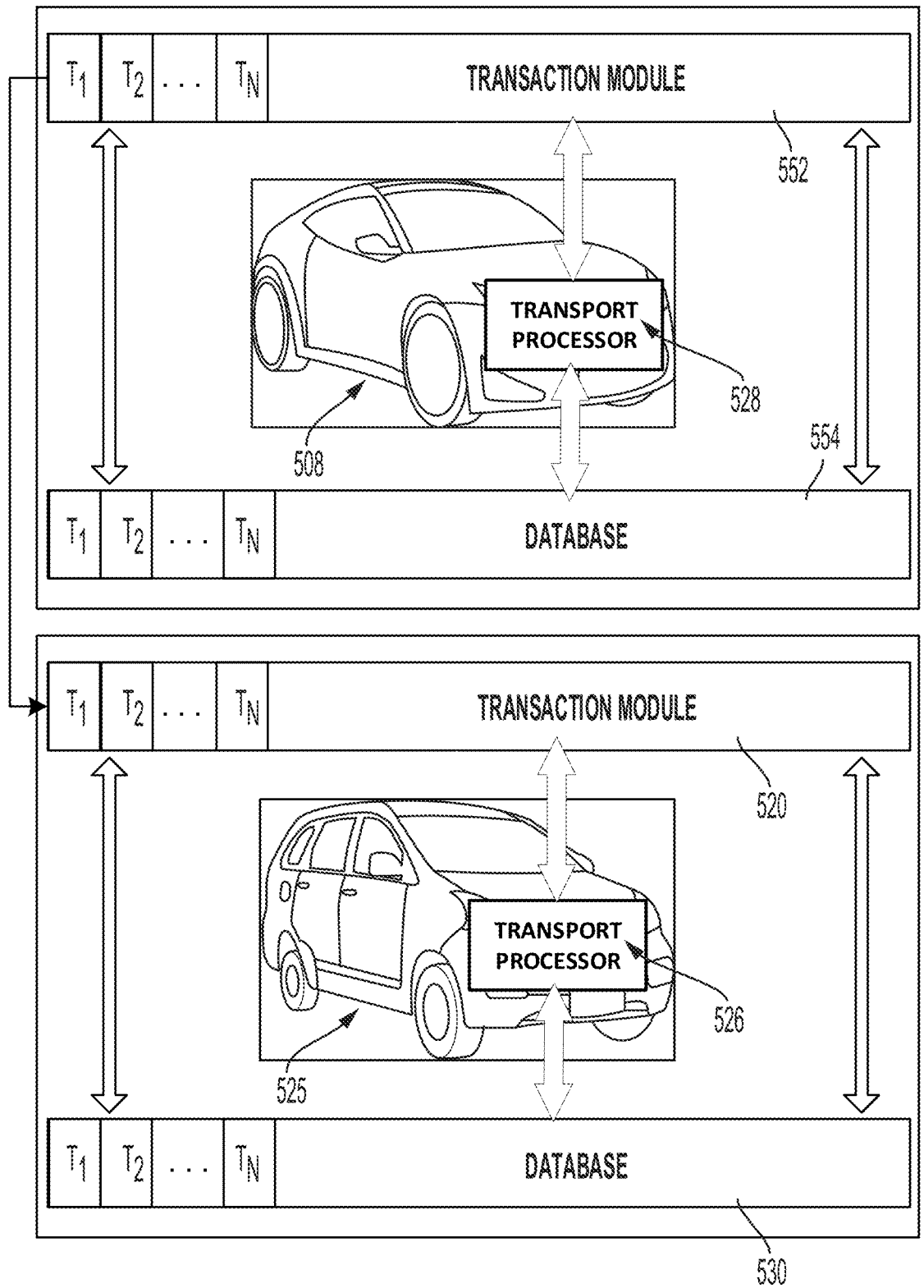
FIG. 5B illustrates another example vehicle configuration for managing database transactions conducted among various vehicles, according to example embodiments

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
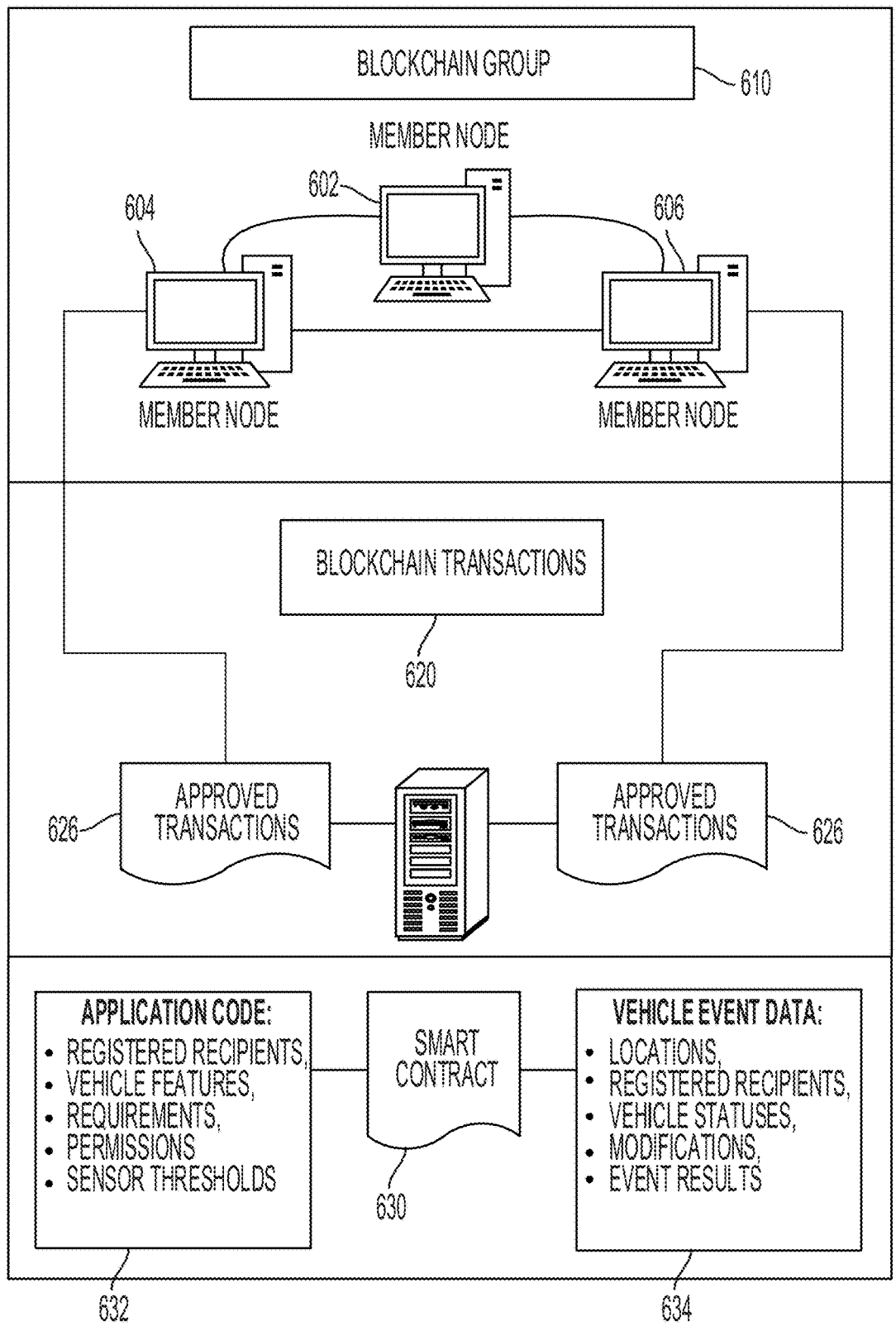
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
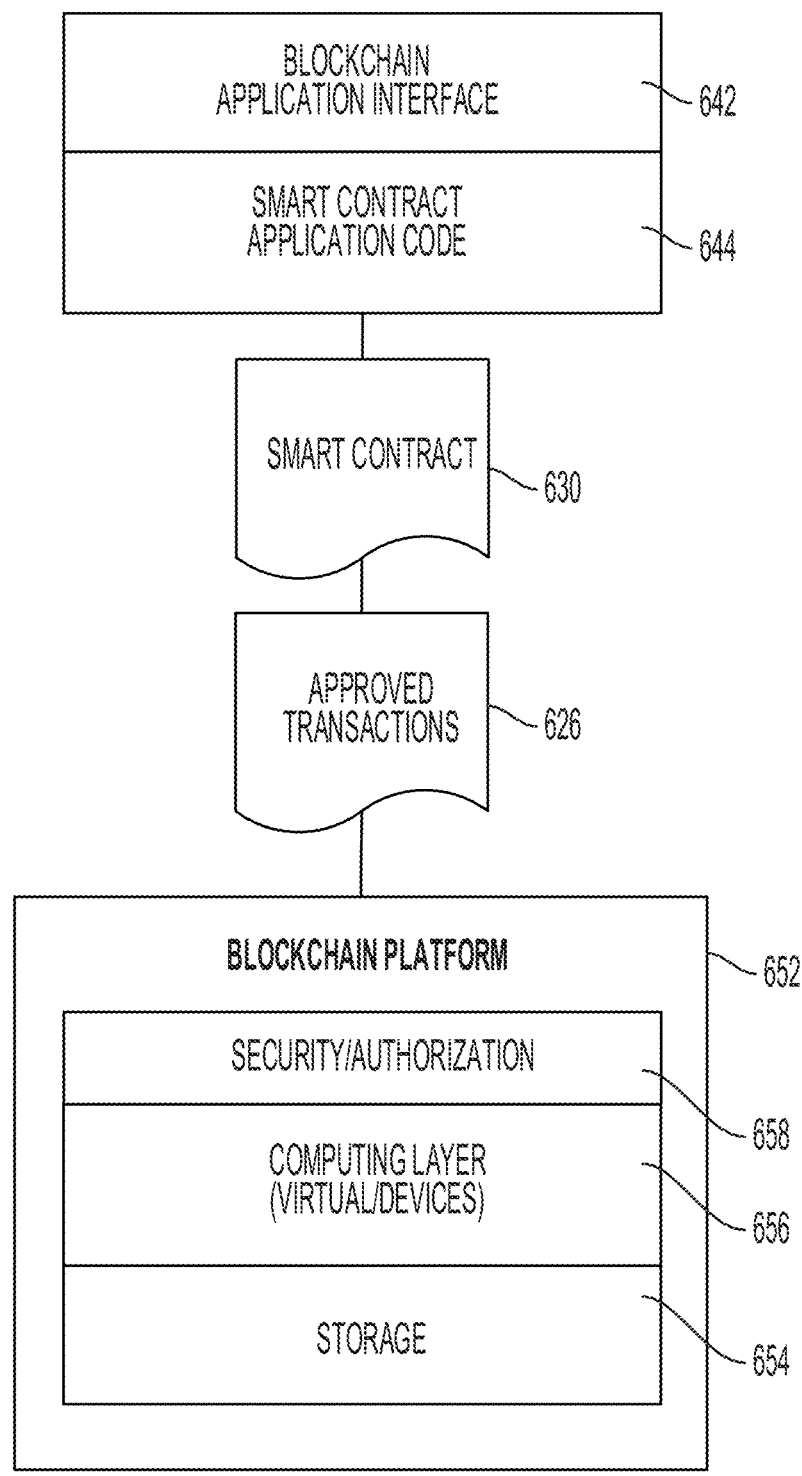
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
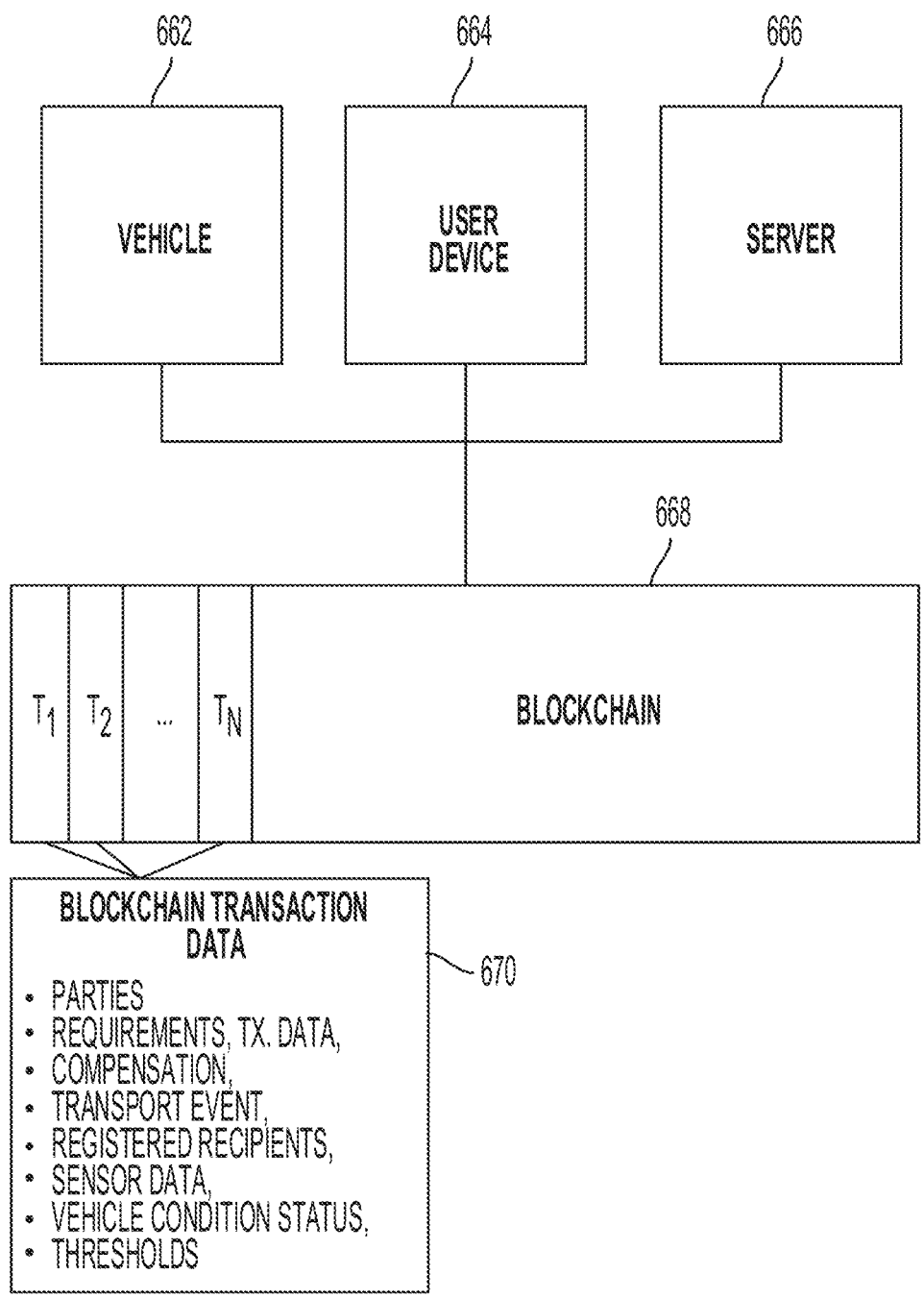
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
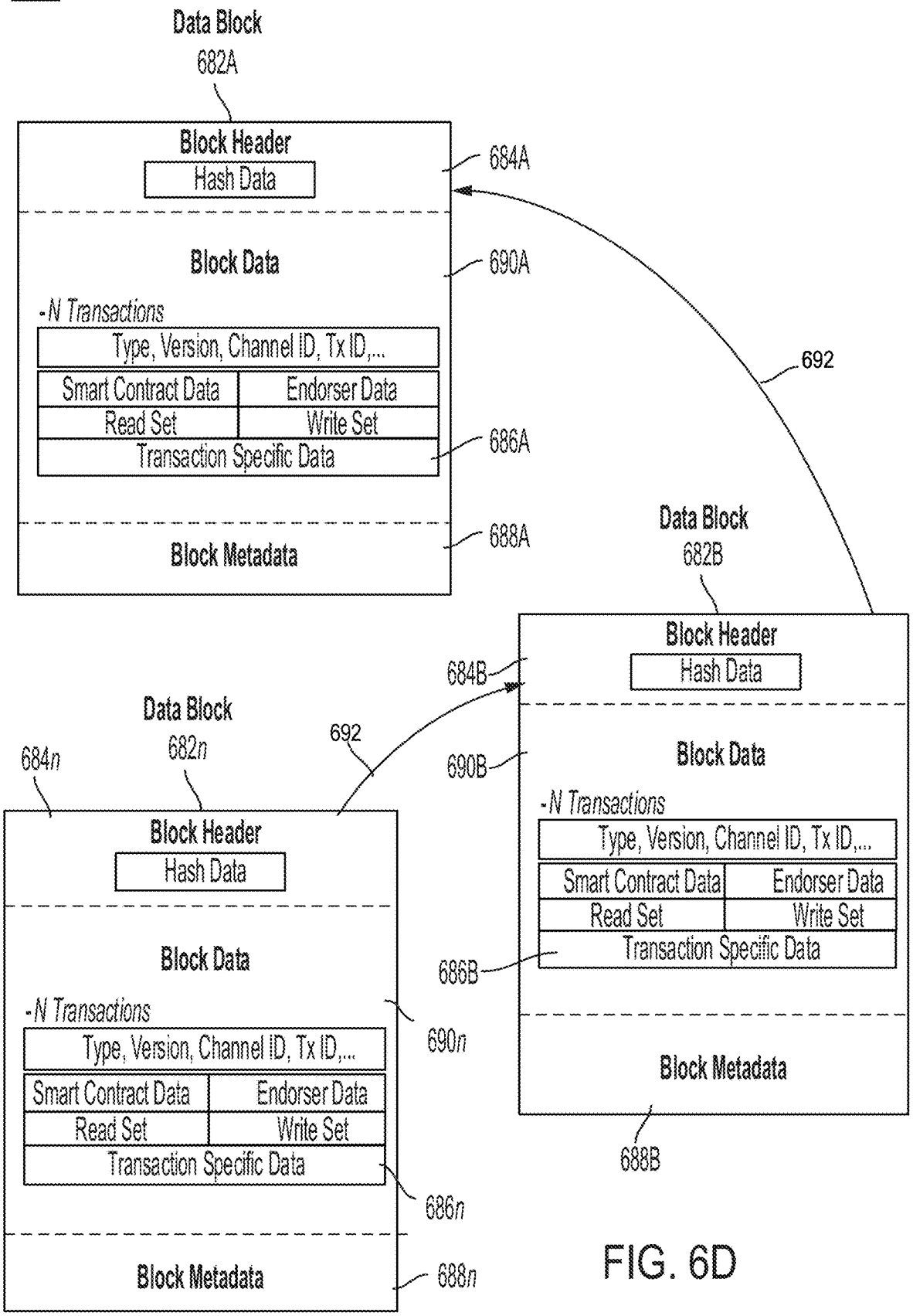
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A, which stores entry data; however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
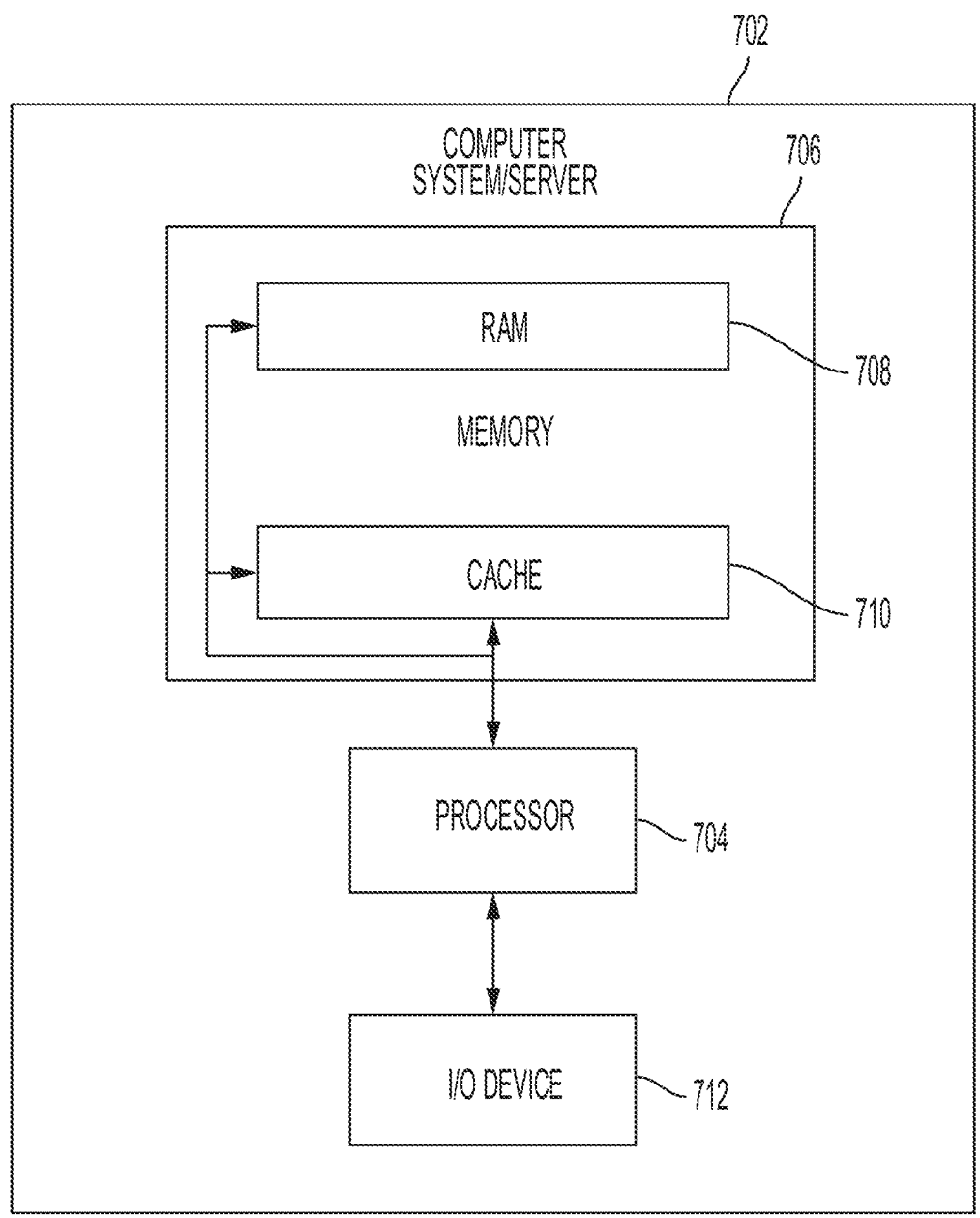
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining, by a transport at a first location, that the transport will be in an idle state for a period of time;
   determining, by the transport, that a battery of the transport has surplus energy that can be discharged based on a current power level of the battery;
   obtaining a profile of the transport comprising a do-not disturb geographic area;
   determining, to travel to a second location and discharge the surplus energy based on the period of time and the first location of the transport being outside of the do-not disturb geographic area included in the profile;
   maneuvering by the transport to the second location; and
   discharging the surplus energy to a charging station at the second location.

2. The method of claim 1, comprising:
   identifying the second location based on a number of other transports providing energy to the second location.

3. The method of claim 1, comprising:
   identifying the second location based on at least one of a weather condition and a natural occurrence.

4. The method of claim 1, comprising:
   prompting for either a user confirmation of the maneuvering to the second location or an override of the maneuvering to the second location.

5. The method of claim 1, comprising:
   calculating the period of time that the transport will be in the idle state based on an analysis of historical use of routes and times of use of the transport ending.

6. The method of claim 1, comprising:
   identifying an amount of energy to be transferred from the transport to the second location based on an average amount of energy transferred from a plurality of transports.

7. The method of claim 1, comprising:
   identifying the second location based on a consensus of a plurality of other transports.

8. A transport, comprising:
   a processor that, when executing one or more instructions, is configured to:
   determine that the transport is at a first location and will be in an idle state for a period of time;
   determine, by the transport, that a battery of the transport has surplus energy that can be discharged based on a current power level of the battery;
   obtain a profile of the transport comprising a do-not disturb geographic area;
   determine to travel to a second location and discharge the surplus energy based on the period of time and the first location of the transport being outside of the do-not disturb geographic area included in the profile;
   maneuver the transport to the second location; and
   discharge the surplus energy to a charging station at the second location.

9. The transport of claim 8, wherein the processor is configured to:
   identify the second location based on a number of other transports to provide energy to the second location.

10. The transport of claim 8, wherein the processor is configured to:
    identify the second location based on at least one of a weather condition and a natural occurrence.

11. The transport of claim 8, wherein the processor is configured to:
    prompt for either a user confirmation of the maneuvering to the second location or an override of the maneuvering to the second location.

12. The transport of claim 8, wherein the processor is configured to:
    calculate the period of time that the transport will be in the idle state based on an analysis of historical use of routes and times of use of the transport.

13. The transport of claim 8, wherein the processor is configured to:
    identify an amount of energy to be transferred from the transport to the second location based on an average amount of energy transferred from a plurality of transports.

14. The transport of claim 8, wherein the processor is configured to:
    identify the second location based on a consensus of a plurality of other transports.

15. A non-transitory computer-readable medium comprising one or more instructions that, when executed by a processor of a transport, cause the processor to perform:
    determining that the transport is at a first location and will be in an idle state at the first location for a period of time;
    determining, by the transport, that a battery of the transport has surplus energy that can be discharged based on a current power level of the battery;
    obtaining a profile of the transport comprising a do-not disturb geographic area;
    determining to travel to a second location and discharge the surplus energy based on the period of time and the first location of the transport being outside of the do-not disturb geographic area included in the profile;
    maneuvering the transport to the second location; and
    discharging the surplus energy to a charging station at the second location.

16. The non-transitory computer-readable medium of claim 15, wherein the one or more instructions further cause the processor to perform:
    identifying the second location based on a number of other transports providing energy to the second location.

17. The non-transitory computer-readable medium of claim 15, wherein the one or more instructions further cause the processor to perform:
    identifying the second location based on at least one of a weather condition and a natural occurrence.

18. The non-transitory computer-readable medium of claim 15, wherein the one or more instructions further cause the processor to perform:
   prompting for either a user confirmation of the maneuvering to the second location or an override of the maneuvering to the second location.

19. The non-transitory computer-readable medium of claim 15, wherein the one or more instructions further cause the processor to perform:
   calculating the period of time that the transport will be in the idle state based on an analysis of historical use of routes and times of use of the transport ending.

20. The non-transitory computer-readable medium of claim 15, wherein the one or more instructions further cause the processor to perform:
   identifying the second location based on a consensus of a plurality of other transports.

* * * * *